(12) United States Patent
Liu et al.

(10) Patent No.: US 7,616,597 B2
(45) Date of Patent: Nov. 10, 2009

(54) SYSTEM AND METHOD FOR INTEGRATING MOBILE NETWORKING WITH SECURITY-BASED VPNS

(75) Inventors: Changwen Liu, Portland, OR (US); Michael B. Andrews, Beaverton, OR (US); Prakash Iyer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 10/325,657

(22) Filed: Dec. 19, 2002

(65) Prior Publication Data

US 2004/0120295 A1   Jun. 24, 2004

(51) Int. Cl.
*H04W 4/00* (2009.01)
(52) U.S. Cl. .................. 370/328; 370/401; 370/474; 370/475
(58) Field of Classification Search .......... 370/328, 370/400, 401, 474, 475
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 6,055,236 | A * | 4/2000 | Nessett et al. | 370/389 |
| 6,137,791 | A * | 10/2000 | Frid et al. | 370/352 |
| 6,742,036 | B1 * | 5/2004 | Das et al. | 709/226 |
| 7,068,640 | B2 * | 6/2006 | Kakemizu et al. | 370/349 |
| 2001/0021175 | A1 * | 9/2001 | Haverinen | 370/230 |
| 2002/0006133 | A1 * | 1/2002 | Kakemizu et al. | 370/401 |
| 2002/0133534 | A1 * | 9/2002 | Forslow | 709/200 |
| 2003/0224788 | A1 * | 12/2003 | Leung et al. | 455/435.1 |
| 2004/0100951 | A1 * | 5/2004 | O'neill | 370/389 |

FOREIGN PATENT DOCUMENTS

GB   2316841   3/1998

OTHER PUBLICATIONS

"IP Mobility Support", *Network Working Group, Request for Comments No. 2002*, Perkins, C., (ed.), Obtained from http://www.ietf.org/rfc/rfc2002.txt?number, (Oct. 1996), 79 p.
"Mobile IPv4 Traversal Across VPN or "NAT and VPN" Gateways", *Intel Labs Technical Overview*, http://www.connectathon.org/talks02/farid.pdf, (Mar. 6, 2002), 1-12.
Gupta, V., et al., "Secure and Mobile Networking", *Mobile Networks and Applications*, 3 http://portal.acm.org, (1998), 381-390.

(Continued)

*Primary Examiner*—Jayanti K Patel
*Assistant Examiner*—Bo Hui A Zhu
(74) *Attorney, Agent, or Firm*—Schwegman, Lundberg & Woessner, P.A.

(57) ABSTRACT

Systems and methods provide a secure network path through an inner and outer firewall pair between a mobile node on a foreign network and a corresponding node on a home network. One aspect of the systems and methods includes providing a mobile IP proxy between the mobile node and a VPN gateway inside the firewalls. The mobile IP proxy acts as a surrogate home agent to the mobile node, and acts as a surrogate mobile node to a home agent residing on the home network.

18 Claims, 10 Drawing Sheets

OTHER PUBLICATIONS

Montenegro, G., et al., "Sun's SKIP Firewall Traversal for Mobile IP", *Network Working Group, Request for Comments No. 2356* http://www.ietf.org/rfc/rfc2356.txt, (Jun. 1998), 20 p.

Pahlke, F., et al., "Paketfilter- und Tunnelkonfiguraion zur Firewall-vertraglichen Mobilitatsunterstutzung in IP-Netzen", *Proceedings of Kommunikation in Verteilten Systemen Kivs 2001,* Obtained from http://www.tkn.tu-berlin.de/{schaefer/Publications/paper-fatima-kivs2001.pdf, (Feb. 2001), 59-68.

Adrangi, F., et al., "Mobile IPv4 Traversal Across VPN or ôNAT and VPNö Gateways", *Internet Draft, Internet Engineering Task Force,* <draft-adrangi-mobileip-natvpn-tranversal-01>, (Feb. 23, 2002), 24 pgs.

* cited by examiner

SYSTEM AND METHOD FOR INTEGRATING MOBILE NETWORKING WITH SECURITY-BASED VPNS

FIELD

The present invention relates generally to computerized systems and methods for providing mobile networking, and more particularly to integrating mobile networking with security mechanisms for routing network data between a mobile node and a corresponding node.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright® 2002, Intel Corporation. All Rights Reserved.

BACKGROUND

The use of wireless networking continues to grow at a rapid pace. Wireless networks are attractive for a number of reasons. They are convenient, they allow flexibility and roaming, and can support dynamic environments. Furthermore, they are relatively easy to install when compared with their wired counterparts. In some cases, for example in older buildings, they may be cheaper to deploy. An entire network can be put together in a matter of hours rather than days with no need for wiring or rewiring. In many scenarios, wireless networks can have a lower cost of ownership than their wired counterparts despite the cheaper cost of wired LAN cards.

A further trend in computing has been an increased use of security mechanisms to prevent unauthorized or malicious use of personal and corporate computer resources. For example, many companies and individuals have installed "firewalls" to protect systems inside the firewall from unauthorized access. As is known in the art, firewalls can be implemented in both hardware and software, or a combination of both. Firewalls are frequently used to prevent unauthorized Internet users from accessing private networks connected to the Internet, especially intranets. All messages entering or leaving the intranet typically pass through the firewall, which examines each message and blocks those that do not meet the specified security criteria.

While firewalls are useful tools to increase network security, they pose problems for wireless users outside of the firewall that have legitimate needs to access systems inside the firewall. Security schemes implemented by firewalls often use IP addresses and depend on IPSec to aid in determining if a network data packet should be allowed through the firewall. Unfortunately, in the case of wireless systems, a mobile node's IP address may change frequently as the user roams from one wireless network to another. As a result, the security mechanism, e.g. IPSec, must be re-established every time the user roams into a new network. The re-establishment of security mechanisms to a new network connection can be costly, both in terms of CPU cycles and in the elapsed time the user has to wait for a new secure connection to be established.

In view of the above problems, there is a need in the art for the present invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description. Further, the same base reference number (e.g. 120) is used in the specification and figures when generically referring to the actions or characteristics of a group of identical components. A numeric index introduced by a decimal point (e.g. 120.1) is used when a specific component among the group of identical components performs an action or has a characteristic.

The detailed description is divided into multiple sections. In the first section the hardware and software operating environment of different embodiments of the invention is described. In the second section methods according to various embodiments of the invention are described. In the final section, a conclusion is provided.

Operating Environment

Figure 1A:
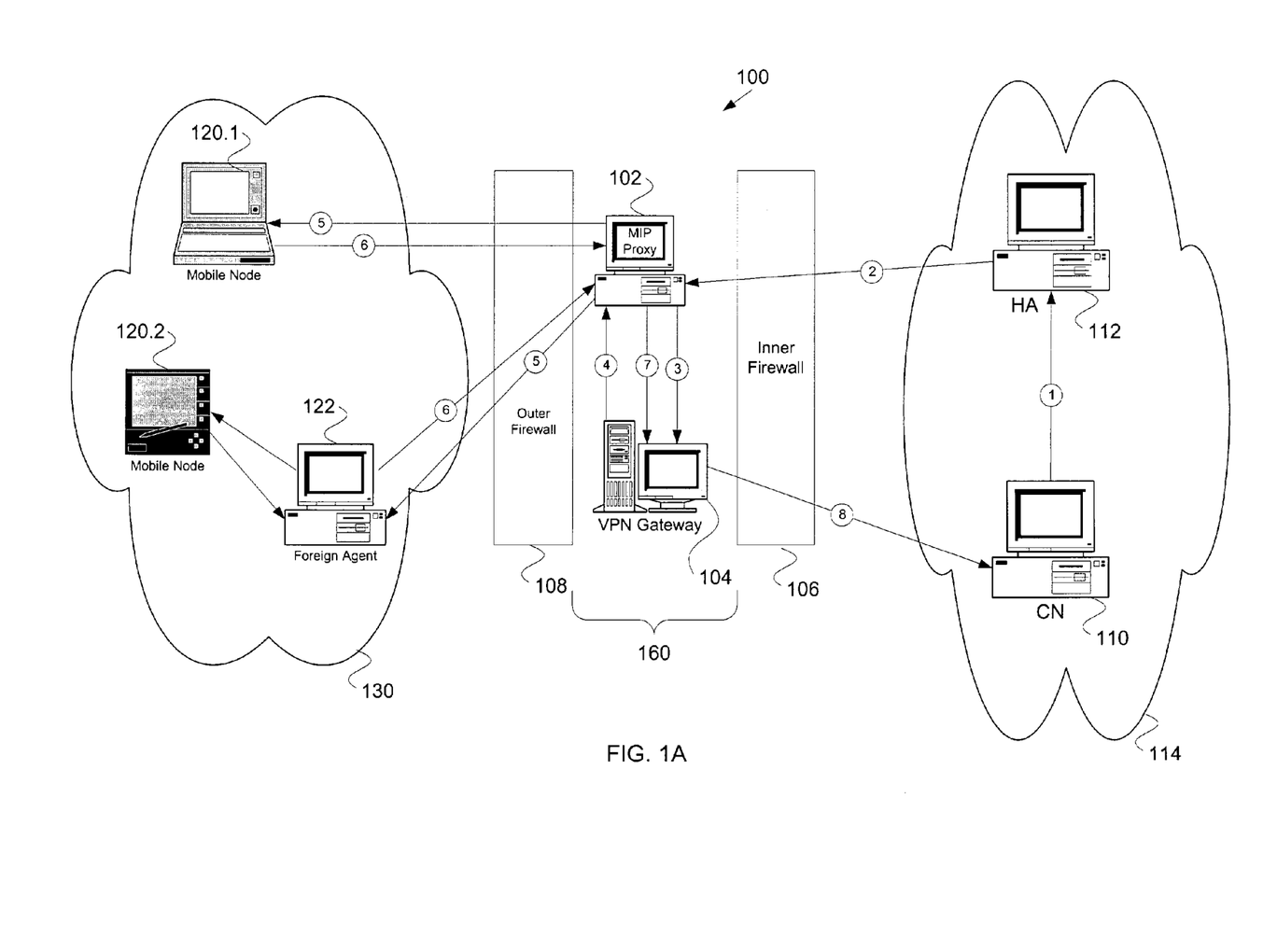
FIG. 1A is a block diagram illustrating a system level overview of an exemplary embodiment of the invention.

FIG. 1A is a block diagram of a hardware and software operating environment 100 incorporating various embodiments of the invention. The systems and methods of the present invention may be provided on any hardware or software system that supports mobile networks. Typically such hardware includes personal computers, server computers, mainframe computers, laptop computers, portable handheld computers, personal digital assistants (PDAs) network enabled cellular telephones and hybrids of the aforementioned devices. In some embodiments of the invention, operating environment 100 includes corresponding node 110, home agent 112, security gateway 104, mobile IP proxy 102, foreign agent 122, mobile node 120, inner firewall 106 and outer firewall 108. The software components running in the operating environment are typically read from a machine-readable media and run under the control of an operating system, and interfaced with the operating system. Examples of such machine-readable media include hard disks, floppy disks, CD-ROMs, DVD-ROMs. Further, machine-readable media includes wired and wireless signals transmitted over a network. Examples of operating systems include Windows® 95, Windows 98®, Windows Me®, Windows CE®, Windows® NT, Windows 2000®, and Windows XP® by Microsoft Corporation. However, the present invention is not limited to any particular operating system, and in alternative embodiments the software components may operate within the Palm OS® from Palm Inc., variants of the UNIX and Linux operating systems and cellular telephone operating systems.

In some embodiments of the invention, operating environment 100 supports network communications between mobile node 120 and a corresponding node 110. Mobile node 120 may be any mobile computing device supporting wired and/or wireless network communications. Examples of such devices include laptop computers, handheld computers, personal digital assistants and network enabled cellular telephones. The invention is not limited to any particular mobile computing device for mobile node 120.

Mobile node 120 typically is assigned a home network 114 and will have a permanent home network address assigned to it. Home network 114 may be any type of network; typically home network 114 will be a private network such as a corporate network or a campus network. However, the present invention is not limited to any particular type of home network 114. Corresponding node 110 may be any type of network attached device that either sends or receives data to/from mobile node 120, including a server computer, mainframe computer, personal computer, router, handheld, laptop, PDA, cellular phone etc. The present invention is not limited to any particular type of corresponding node 110.

In some embodiments of the invention, home agent 112 and foreign agent 122 are network nodes that facilitate mobile network communications substantially in accordance with the RFC 2002, RFC 3220, and/or RFC 3344 standards track protocol for Mobile IP communications, published October 1996, January 2002 and August 2002 respectively by the Mobile IP Working Group of the Internet Engineering Task Force (IETF). Home agent 112 serves as a router in the home subnet of the mobile node, directing traffic to mobile node 120 when mobile node 120 is located outside of its home subnet, for example, when mobile node 120 is connected on foreign network 130. Foreign network 130 may be any type of wired or wireless network. In some embodiments, foreign network 130 comprises the Internet.

In some embodiments of the invention, when mobile node 120.2 moves into a new network 130, mobile node 120.2 registers with foreign agent 122. Foreign agent 122 typically grants a care-of network address to the mobile node and relays a request from the mobile node informing a home agent of the care-of address. The home agent can choose to honor the request and sends an acknowledgement back to the mobile node through the foreign agent. Then the home agent forwards network packets destined to the mobile node to the mobile node in the foreign network 130 through foreign agent 122. Not all foreign networks 130 will have a foreign agent. In some embodiments of the invention, mobile node 120.1 can act as its own foreign agent. In some embodiments, mobile node 120 uses DHCP (Dynamic Host Configuration Protocol) to acquire a care-of address to use on foreign network 130.

Often private networks such as corporate and campus networks are protected in order to prevent unauthorized access to computers and systems on the private network. In some embodiments of the invention, home network 114 is protected by an inner firewall 106 and outer firewall 108. Firewalls 106 and 108 examine data packets and messages and block those that do not meet specified security criteria. Inner and outer firewalls 106 and 108 form what is known in the art as a DMZ 160 (Demilitarized Zone). Typically, a DMZ contains devices that are accessible to Internet traffic, such as Web (HTTP) servers, FTP servers, SMTP (e-mail) servers and DNS servers. While the use of inner and outer firewalls to establish a DMZ is desirable from a security perspective, the systems and methods of the invention are fully applicable to environments with only one firewall or no firewalls.

In some embodiments of the invention, DMZ 160 contains a VPN (Virtual Private Network) gateway 104 and a MIP (Mobile IP) proxy 102. VPN gateway 104 facilitates the creation of VPNs between nodes on an internal network and nodes on a foreign network such as foreign network 130. A VPN is a secure network link over a public IP infrastructure. An example of a VPN protocol is IP Security (IPSec). However, the present invention is not limited to a particular VPN protocol.

MIP proxy 102 serves as an intermediary between home agent 112 and foreign agent 122. In some embodiments of the invention, MIP proxy 102 acts as a surrogate home agent to a mobile node 120, and acts as a surrogate mobile node to a home agent 114. In the exemplary embodiment illustrated in FIG. 1A, MIP proxy 102 is not running on the same computer as VPN gateway 104. In these embodiments, MIP proxy 102 acts as a surrogate foreign agent to VPN gateway 104.

Figure 1B:
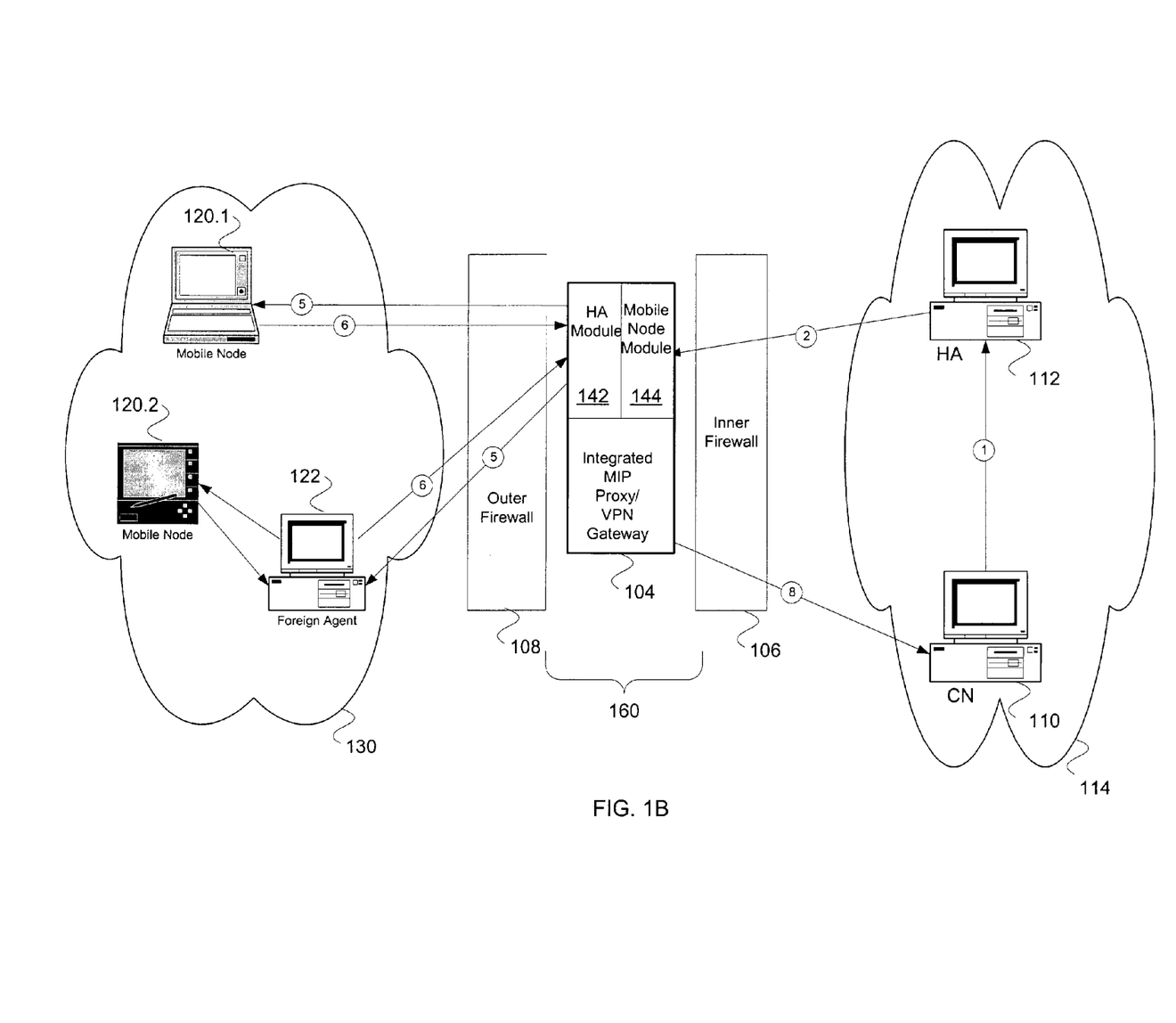
FIG. 1B is a block diagram illustrating a system level overview of an alternative exemplary embodiment of the invention.

FIG. 1B provides a block diagram of a system according to various embodiments of the invention where MIP proxy 102 may be implemented on the same hardware and software as VPN gateway 104. In these embodiments, the integrated MIP proxy/VPN gateway computer includes a mobile node (MN) module 144 module that emulates a mobile node for home agent 112, and a home agent (HA) module 142 that emulates a home agent for mobile nodes 120 (or alternatively, foreign agent 122).

Figure 1C:
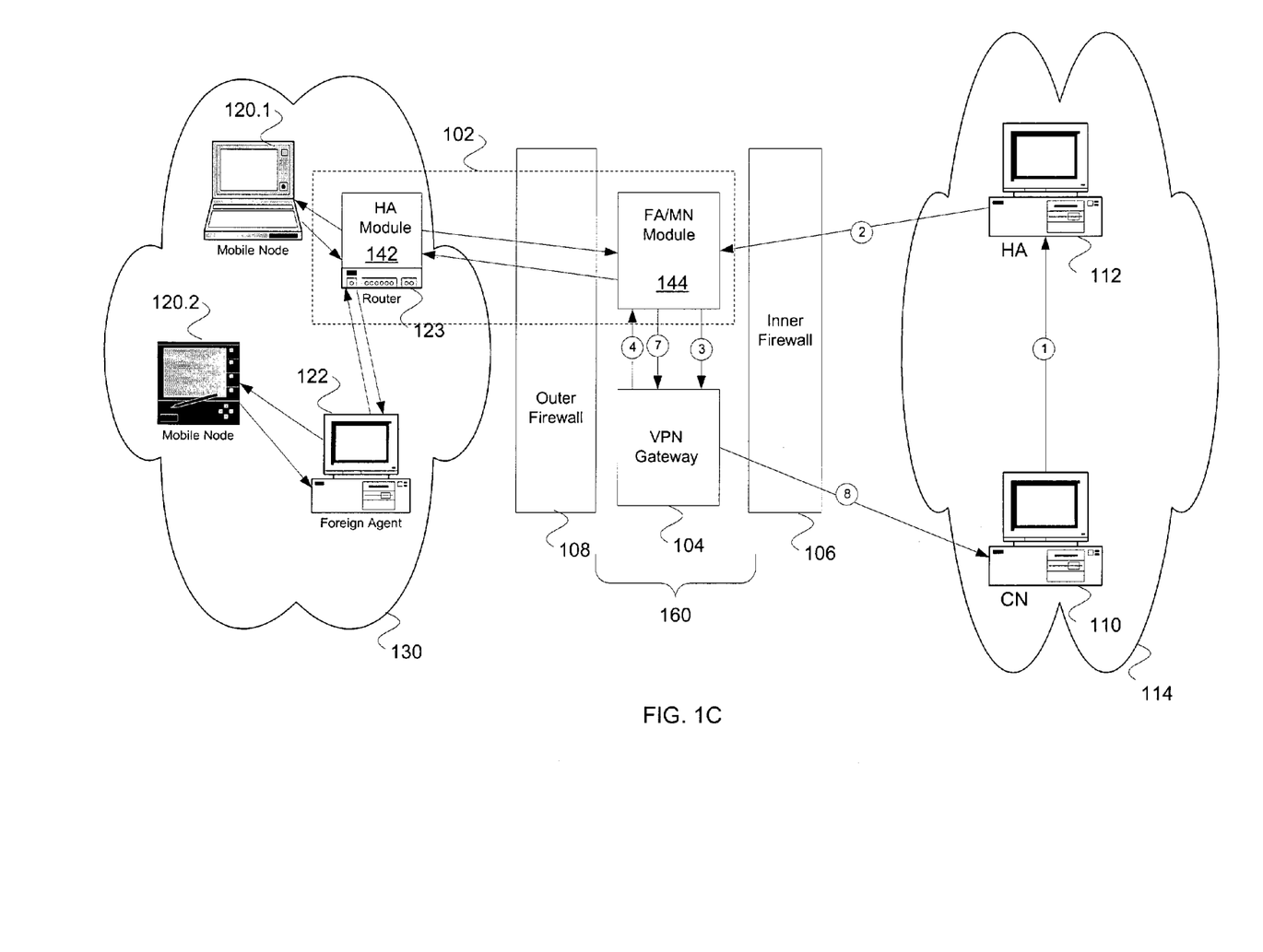
FIG. 1C is a block diagram illustrating a system level overview of a further alternative exemplary embodiment of the invention.

FIG. 1C provides a block diagram of an alternative embodiment wherein MIP proxy 102 functional components HA module 142 and MN/FA module 144 may be implemented on different computers: the HA module 142 may be implemented in a WAN side box, e.g. WAN router 123 outside of the outer layer firewall 108, and the MN/FA module 144 may be implemented in a DMZ 160 inside the outer layer firewall, and there is a secure packet data tunnel connecting the HA module 142 with the MN/FA module 144 across the outer layer firewall 108, so the HA module can send and receive packets from the MN/FA module. In other words, the HA module will send all received Mobile TPv4 packets to MN/FA module for further processing, and the MN/FA module will send all packets received from VPN gateway to the HA modules for further processing. The secure packet data tunnel may be established at any layer in the network stack, including the network layer, transport layer or application layer.

Figure 1D:
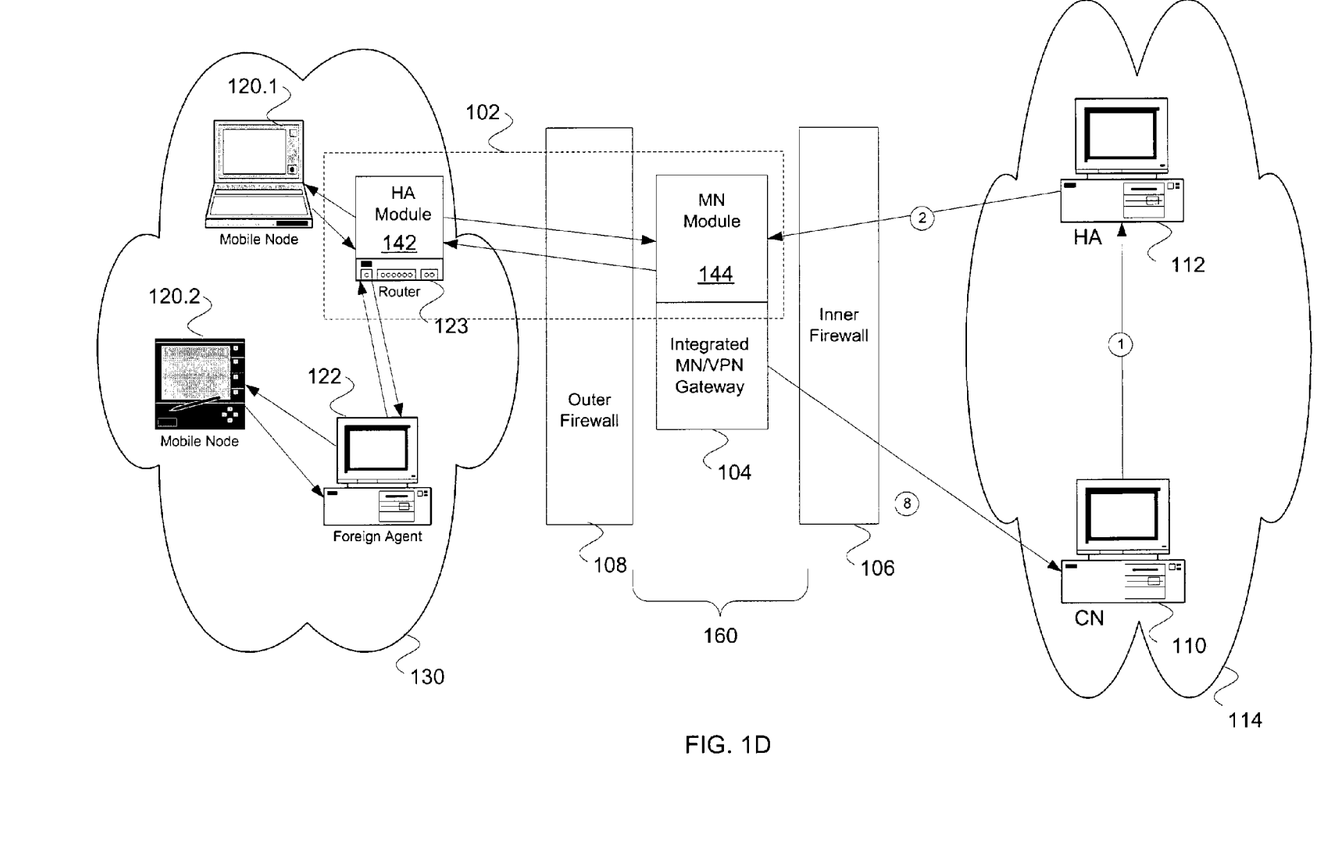
FIG. 1D is a block diagram illustrating a system level overview of a still further alternative exemplary embodiment of the invention.

FIG. 1D provides another block diagram of a system according to various embodiments of the invention where MIP proxy 102 may be implemented on different hardware components. In these embodiments, the MIP proxy comprises HA module 142 and MN module 144 implemented on different computers: In these embodiments, the HA module 142 may be implemented in a WAN side box, e.g. WAN router 123 outside of the outer layer firewall 108, and the MN module 144 may be implemented in the VPN Gateway, and there is a secure and transparent internal tunnel connecting the HA module with the MN module at the VPN Gateway across the outer layer firewall so the HA module can send and receive packets from the MN module. In other words, the HA module will send all received Mobile IPv4 packets to the MN module for further processing, and the VPN Gateway will send all encrypted packets to the HA module for further processing. Again, the secure packet data tunnel may be established at any layer in the network stack, including the network layer, transport layer or application layer.

Returning to FIG. 1A, the operation of the system described above will now be described in general terms, with further details on the operation of various embodiments of the invention provided in the methods section below. When mobile node 120 registers on a foreign network, in some embodiments it registers with MIP proxy 102. In addition, a data traffic network tunnel is created between mobile node 120 and MIP proxy 102. Mobile node 120 also creates an IPSec SA (Security Association) between the node's permanent home address and the VPN gateway 104. The SA may be created manually, or it may be created using a key management protocol such as IKE (Internet Key Exchange). The SA will then be applied to any network data destined to a node inside home network 114, such as corresponding node 110 by the mobile node. This may be accomplished by applying IPSec SA encapsulation prior to Mobile IP encapsulation by the mobile node.

In alternative embodiments of the invention, mobile node 120 registers with a foreign agent 122, specifying MIP proxy 102 as a home agent. Foreign agent 122 then interacts with MIP proxy 102 as if the MIP proxy were the real home agent for mobile node 120.

After receiving a registration request from mobile node 120, in some embodiments of the invention where the MIP proxy 102 is separate from the VPN gateway 104, the MIP proxy 102 sends a registration request on behalf of the mobile node 120 that specifies the MIP proxy as the care-of address for the mobile node 120. In addition, MIP proxy 102 begins intercepting packets destined for the mobile nodes permanent home network address and tunnels the packets to the mobile node's foreign agent care of address (note that the mobile node may be acting as its own foreign agent).

After receiving the registration request, the home agent 112 binds the MIP proxy address as the care-of address of the mobile node 120. In some embodiments where the MIP proxy 102 is separate from the VPN gateway 104, the MIP proxy sends a one time initial and separate registration on behalf of VPN gateway 102 to home agent 112 that specifies an address of the MIP proxy 102 as the care-of address for VPN gateway 104. After receiving the registration request from MIP proxy 102, home agent 114 binds the MIP proxy address as the care-of address for VPN gateway 104. In addition, the home agent 112 establishes an IPSec SA with VPN gateway 104 and applies the SA to all network packets that it intercepts from corresponding nodes on home network 114 that are destined for permanent home network address of mobile node 120. In some embodiments, the IPSec SA encapsulation is applied prior to any Mobile IP encapsulation that is applied.

Figure 2A:
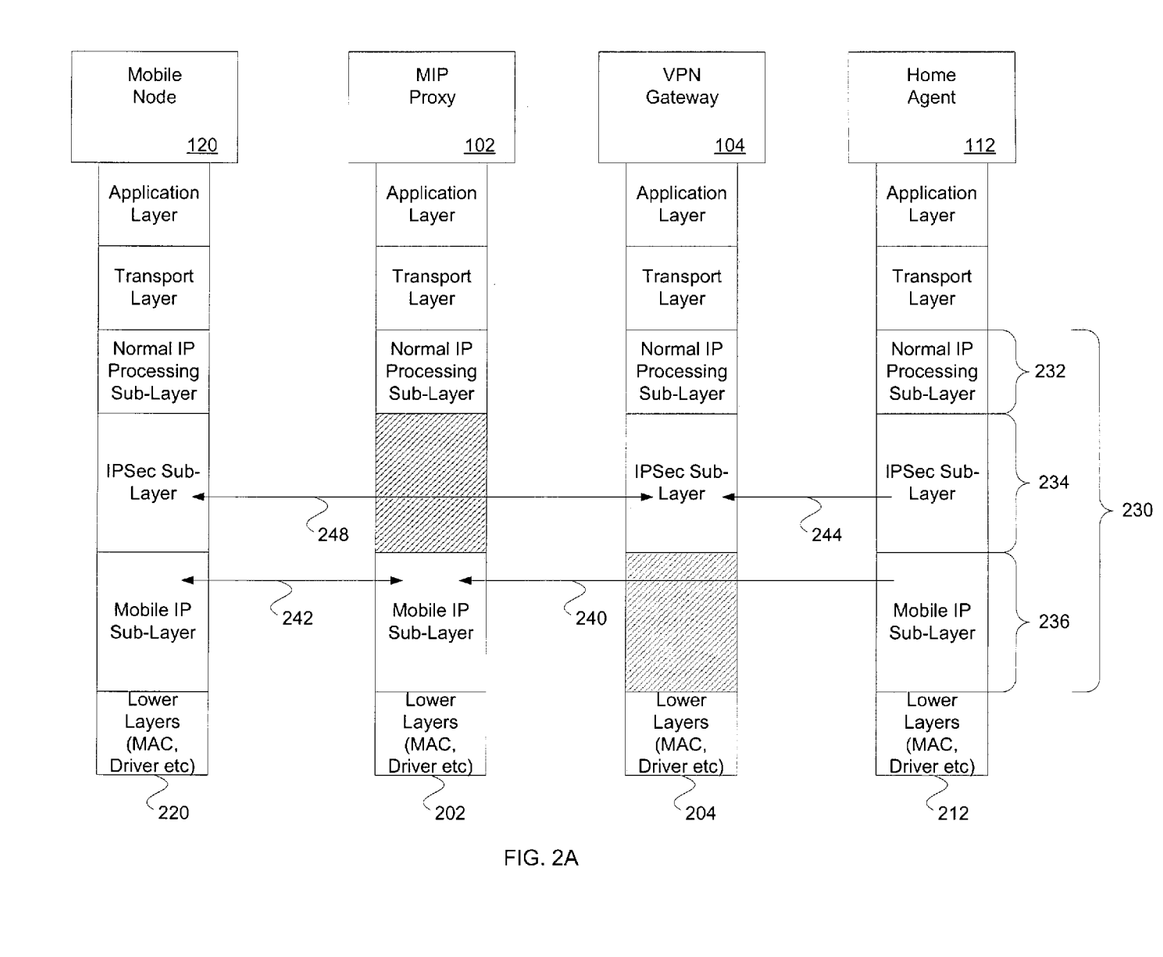
FIG. 2A is a diagram illustrating communications between network layers of the components of an exemplary embodiment of the invention as shown in FIG. 1A.

FIG. 2A provides an illustration of the data transmission between various network layers of the various entities in some embodiments of the invention where the MIP proxy is a separate computer system from VPN Gateway 104. In some embodiments, each of the major nodes such as mobile node 120, MIP proxy 102, VPN gateway 104, and home agent 112 have a network stack 220, 202, 204 and 212 respectively. The network stacks will typically include a TCP/IP network stack 230. TCP/IP network stack 230 can be further subdivided into sub-layers, a "normal" IP sub-layer 232, a security sub-layer 234, and a mobile IP sub-layer 236. In some embodiments of the invention, security layer 234 is an IPSec sub-layer. Note that not all nodes will require all sub-layers. Connections 240, 242, 244 and 248 illustrate the data communication between the various network layers.

Figure 2B:
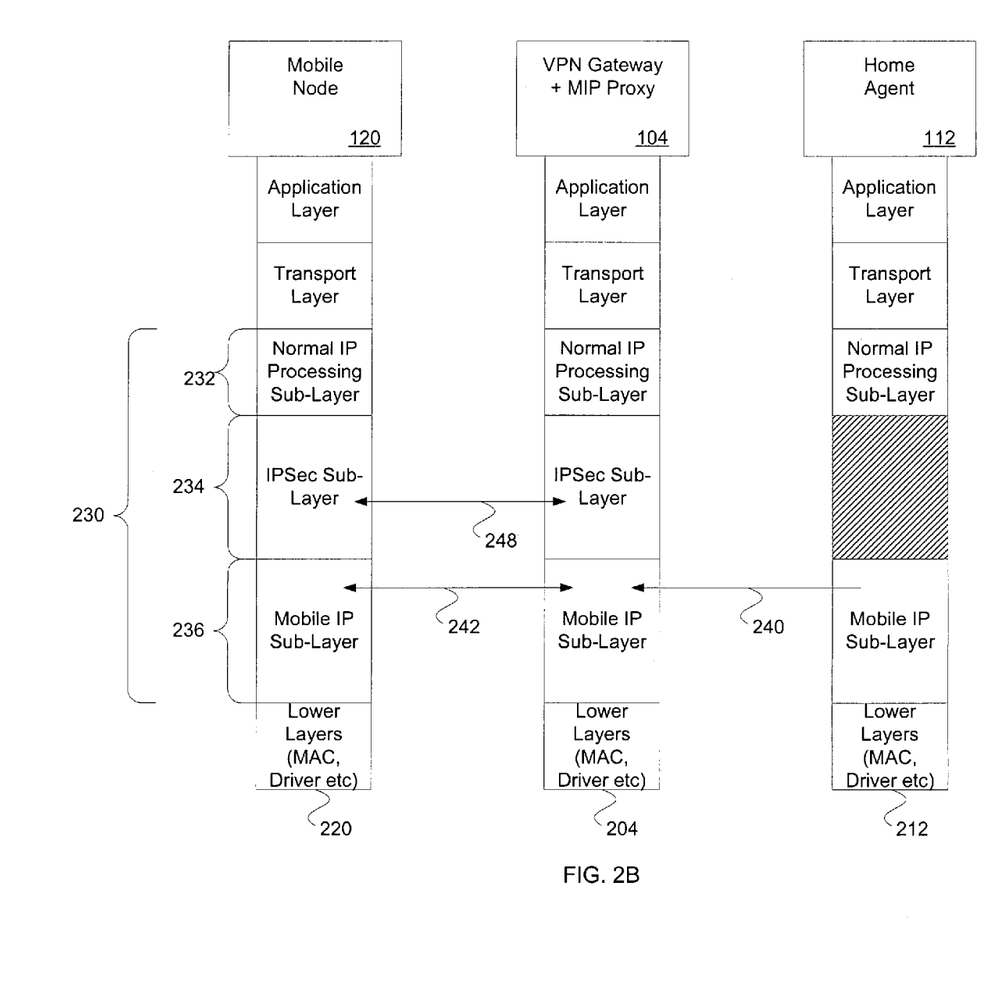
FIG. 2B is a diagram illustrating communications between network layers of components of an alternative exemplary embodiment of the invention as shown in FIG. 1B.

FIG. 2B provides an illustration of the data transmission between various network layers of the various entities in an embodiment of the invention wherein the MIP proxy is co-located with the VPN Gateway. Each of the major nodes such as mobile node 120, MIP proxy+VPN gateway 104, and home agent 112 have a network stack 220, 204 and 212 respectively. Typically, this network stack will include a TCP/IP network stack 230. TCP/IP network stack 230 can be further subdivided into sub-layers, a "normal" IP sub-layer 232, a security sub-layer 234, and a mobile IP sub-layer 236. In these embodiments of the invention, security layer 234 is an IPSec sub-layer. Note that not all nodes will require all sub-layers.

Figure 2C:
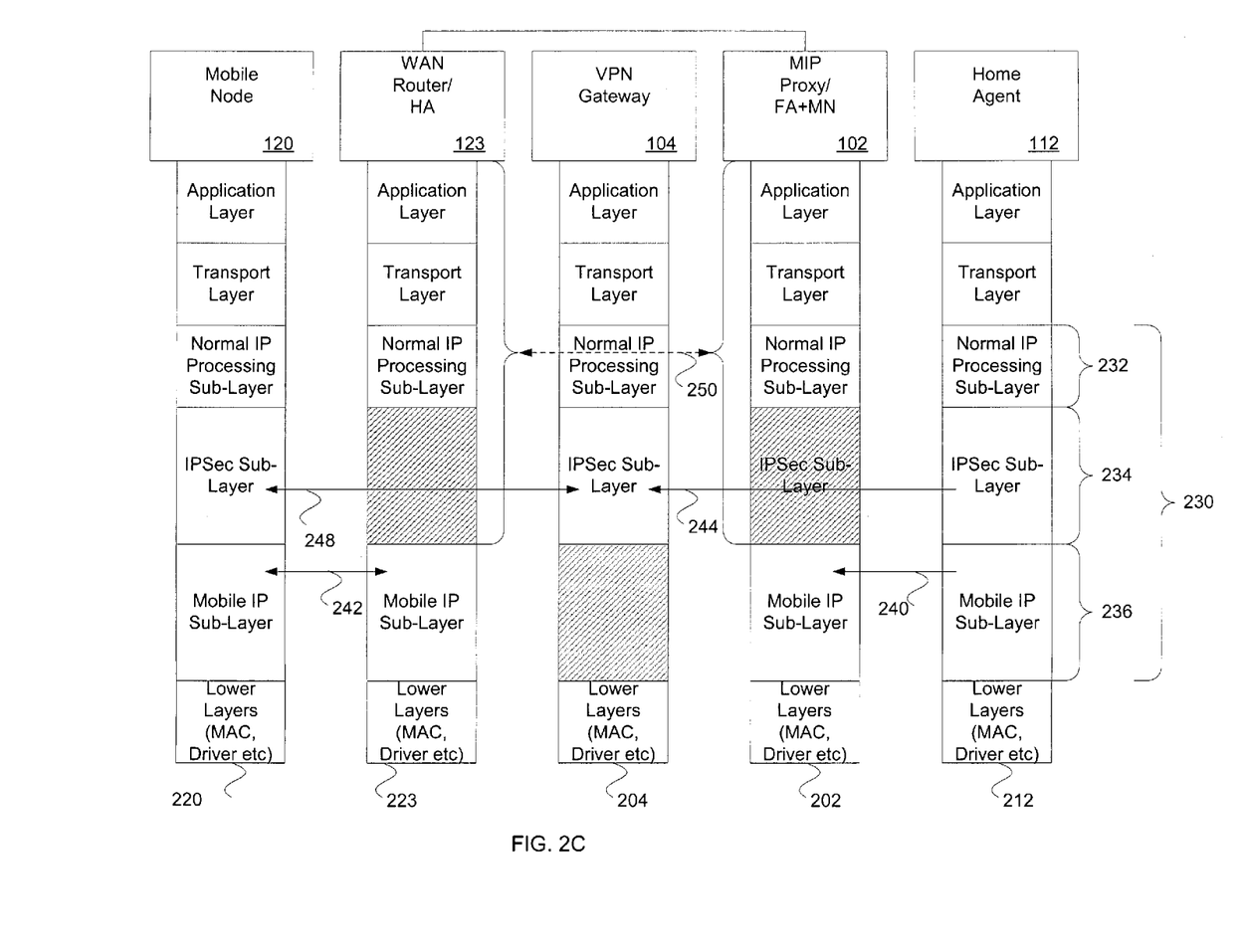
FIG. 2C is a diagram illustrating communications between network layers of components of a further alternative exemplary embodiment of the invention as shown in FIG. 1C.

FIG. 2C provides an illustration of the data transmission between various network layers of the various entities in embodiments of the invention where MN/FA module of the MIP proxy resides in a separate computer system from the VPN gateway in a DMZ, and where the HA module is co-located in a WAN router. Each of the major nodes such as mobile node 120, the WAN Router 123, VPN gateway 104, MIP proxy+FA/MN 102 and home agent 112 have a network stack 220, 223, 204, 202 and 212 respectively. Typically, this network stack will include a TCP/IP network stack 230. TCP/IP network stack 230 can be further subdivided into sub-layers, a "normal" IP sub-layer 232, a security sub-layer 234, and a mobile IP sub-layer 236. In these embodiments of the invention, security layer 234 is an IPSec sub-layer. Note that not all nodes will require all sub-layers. The secure packet data tunnel between the HA module and the MN module is represented as connection 250 in the diagram. As noted above and illustrated by the bracketing in FIG. 2C, it can be a tunnel at any layer, such as the network layer, transport layer, or application layer and is typically transparent to other entities.

Figure 2D:
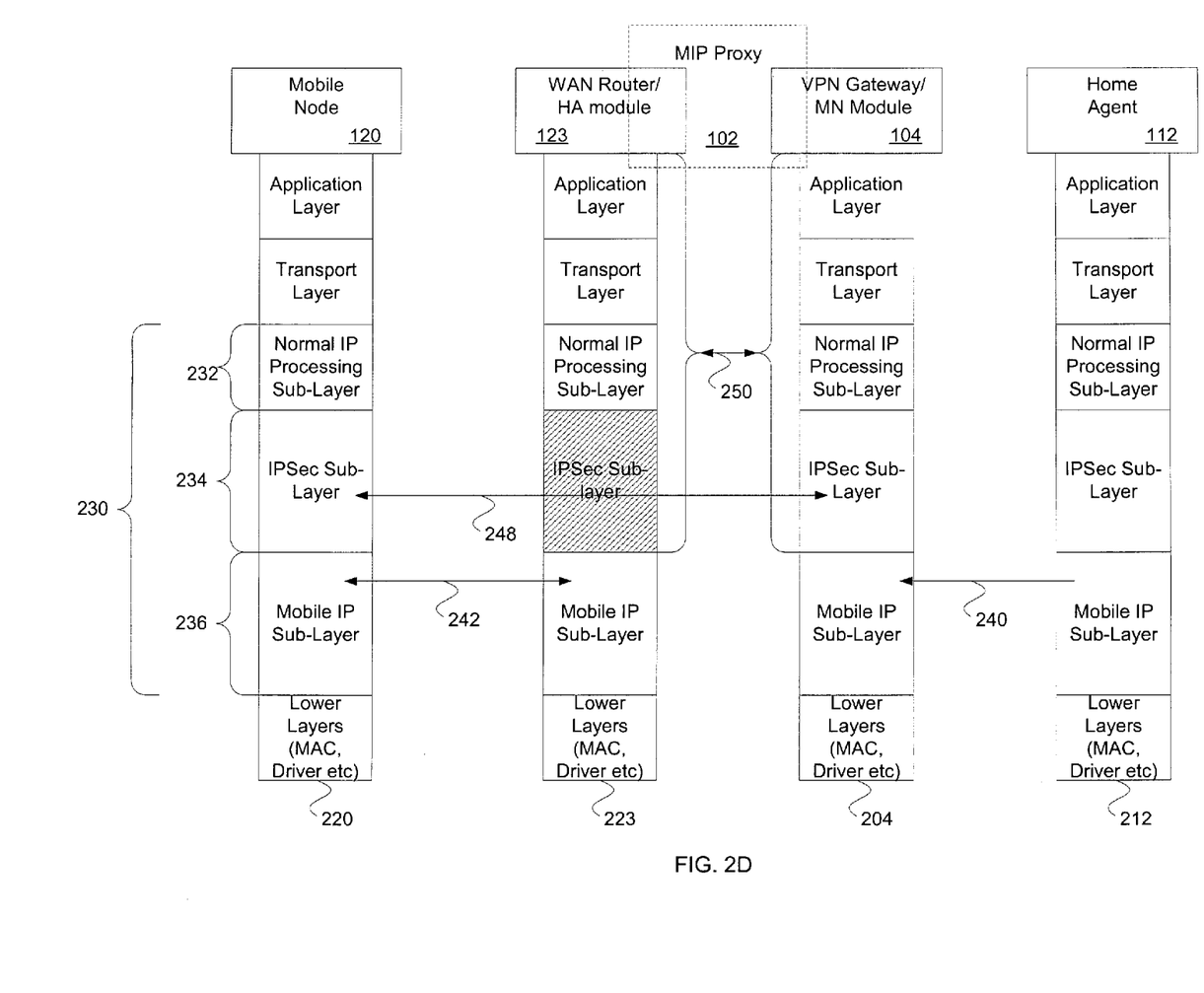
FIG. 2D is a diagram illustrating communications between network layers of components of a still further alternative exemplary embodiment of the invention as shown in FIG. 1D.

FIG. 2D provides an illustration of the data transmission between various network layers of the various entities in an embodiment of the invention wherein the MN module of the MIP Proxy is co-located with the VPN Gateway and the HA module of the MIP Proxy is co-located with a WAN router. Each of the major nodes such as mobile node 120, the WAN Router 123, MIP+VPN gateway 104, and home agent 112 have a network stack 220, 223, 204 and 212 respectively. Typically, this network stack will include a TCP/IP network stack 230. TCP/IP network stack 230 can be further subdivided into sub-layers, a "normal" IP sub-layer 232, a security sub-layer 234, and a mobile IP sub-layer 236. In these embodiments of the invention, security layer 234 is an IPSec sub-layer. Note that not all nodes will require all sub-layers. The secure packet data tunnel between the HA module and the MN module is represented as connection 250 in the diagram. Again, it can be a tunnel at any layer, such as the network layer, transport layer or application layer, and is usually transparent to other entities.

Communications between the layers in some embodiments of the invention are shown by data paths 240, 242, 244 and 248. For example, the IPSec sub-layer of the home agent 212 communicates with the IPSec layer of VPN gateway 204 via path 244 in the case that the MIP Proxy and VPN Gateway are separate. This communication may not be direct. As an example, in those embodiments of the invention where MIP proxy 102 is separate from VPN gateway 104, the IPSec sub-layer data is encapsulated in a mobile IP sub-layer. The mobile IP sub-layer communication is illustrated by data path 240. Similarly, mobile node 220 has a secure communications path 248 to VPN proxy 204. However, the security layer data is encapsulated by a mobile IP layer, which in some embodiments of the invention is routed through MIP proxy 202 via data path 242.

This section has described the various logical modules in a system that provides for integrating mobile IP networks with security based VPNs. As those of skill in the art will appreciate, the software to implement the modules can be written in any of a number of programming languages known in the art, including but not limited to C/C++, Java, Visual Basic, Smalltalk, Pascal, Ada and similar programming languages. The invention is not limited to any particular programming language for implementation.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a series of flowcharts shown in FIGS. 3-4. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 3-4 are inclusive of the acts performed by an operating environment executing an exemplary embodiment of the invention.

Figure 3:
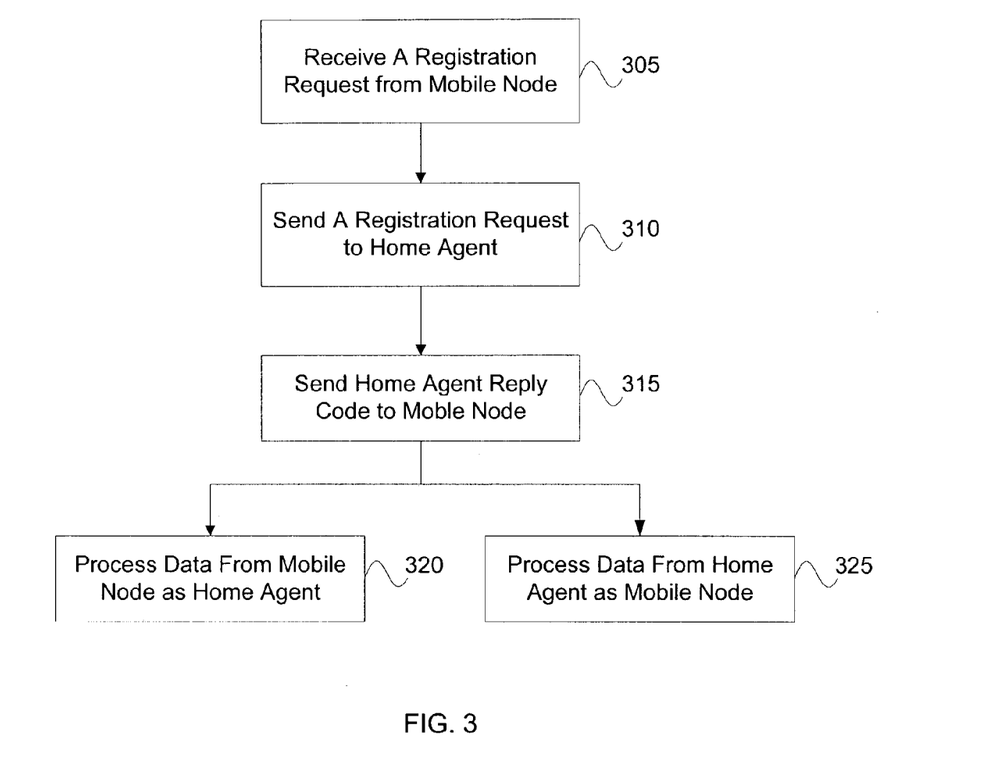
FIG. 3 is a flowchart illustrating a method for establishing secured network communications for a mobile node.
Figure 4A:
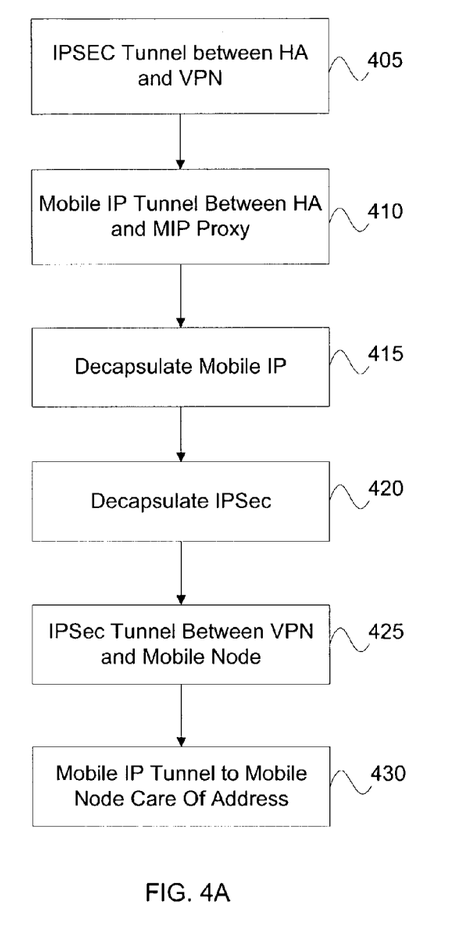
FIGS. 4A and 4B are flowcharts illustrating a method according to an embodiment of the invention for routing network packets to a mobile node through a firewall according to an embodiment of the invention.
Figure 4B:
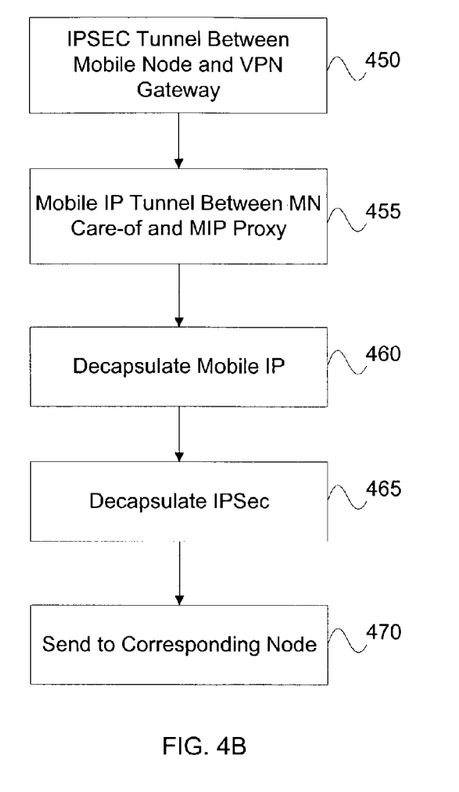

FIG. 3 is a flowchart illustrating a method for providing a secure network path between a mobile node and a corresponding node. The method begins when a system executing the method, such as MIP proxy 102, receives a registration request from the mobile node (block 305). Typically the request will include a permanent network address for the mobile node. The MIP proxy binds the mobile nodes permanent home address to the mobile nodes current care-of address in a mobility bind list. Additionally, the MIP proxy may associate the binding with a home agent.

Next, a system executing the method issues a second registration request to a home agent on the home network for the mobile node (block 310). Typically the second request will include the permanent address of the mobile node and a proxy address of the MIP proxy 102. The home agent binds the mobile node's permanent home address to one of the MIP proxy's addresses in the home agent's mobility binding list.

In some embodiments of the invention, the system executing the method copies a reply code received from the home agent into a reply message that is sent by the system executing the method to the mobile node (block 315). The reply code typically indicates the ability or willingness of the home agent to process network data received from corresponding nodes on the home network that are destined for the mobile node.

Next, in some embodiments of the invention, the system begins to emulate both a home agent (block 320) and a mobile node (block 325). Blocks 320 and 325 are shown at the same level to indicate the potential parallel nature of the execution of the blocks. The system emulates a home agent with respect to data sent to and from the mobile node. Similarly, the system emulates a mobile node with respect to data sent to and from the home agent.

FIG. 4A is a flowchart providing further details on a method according to an embodiment of the invention for processing network data bound for a mobile node from a corresponding node after the mobile node has registered with a MIP proxy. The method begins when a home agent receives a packet on behalf of a mobile node from a corresponding node (e.g. FIG. 1 path 1). In some embodiments of the invention where the MIP proxy is a separate entity from the VPN gateway, the home agent tunnels the packet to the VPN gateway, typically via IPSec (block 405). Next, the home agent tunnels the packet using mobile IP to the MIP proxy (block 410; e.g. FIG. 1 path 2). The packet, including IPSec and mobile IP encapsulation is then sent to the MIP proxy because the MIP proxy is specified as care-of address for the VPN from the home agent's point of view.

The MIP proxy receives the packet from the home agent, and decapsulates the mobile IP layer (block 415). In those embodiments where the MIP proxy is a separate entity from the VPN gateway, the IPSec layer data is forwarded to the VPN gateway for decapsulation (block 420; e.g. FIG. 1A path 3).

The VPN gateway then tunnels the packet using IPSec between the VPN gateway and the mobile node using the permanent network address of the mobile node (block 425). In those embodiments where the MIP proxy is separate from the VPN gateway, the packet is then sent to the MIP proxy for forwarding to the mobile node (e.g. FIG. 1 path 4). The MIP proxy may capture packets bound for the mobile node from the VPN gateway in a number ways. In one embodiment of the invention, the routing table of the VPN is manipulated so that packets for the mobile node are automatically routed through the MIP proxy. In an alternative embodiment of the invention, the MIP proxy responds to ARP (Address Resolution Protocol) packets on behalf of the mobile node. In a further alternative embodiment, the MIP proxy initially establishes itself as the care-of address for the VPN gateway the first time a mobile node requests registration through the MIP proxy.

After receiving the data packet from the VPN gateway, the MIP proxy tunnels the packet to the mobile node using Mobile IP through the mobile node's care-of address on foreign network 130 (Block 430, e.g. FIG. 1 path 5)

FIG. 4B is a flowchart providing further details on a method according to an embodiment of the invention for processing network data bound for a corresponding node from a mobile node after the mobile node has registered with a MIP proxy. The method begins when a packet is tunneled using IPSec between the mobile node and the VPN gateway (block 450). The packet is then tunneled using mobile IP between the mobile node and the MIP proxy (block 455; FIG. 1 path 6). The MIP proxy decapsulates the mobile IP layer (block 460), and forwards the packet to the VPN gateway in those embodiments where the VPN gateway is separate from the MIP proxy (FIG. 1 path 7).

The VPN gateway decapsulates the IPSec packet (block 465). The VPN gateway then sends the data to the corresponding node directly (block 470; FIG. 1 path 8).

It should be noted it may be desirable to bypass the tunneling described above. For example, in some embodiments of the invention, when the mobile node performs IKE with the VPN gateway, the IKE data are carried as normal IP traffic.

CONCLUSION

Systems and methods for providing integration of mobile networks with security based VPNs are disclosed. The embodiments of the invention provide advantages over previous systems. For example, supporting the creation of security associations that use the permanent network address of a mobile node, the systems and methods of the present invention are more efficient than previous systems because there is no need to rekey security associations as the mobile node moves from one subnet to another. Furthermore, the systems and methods can be supported with little or no changes to existing security mechanisms and mobile IP standards. Thus a user can receive the benefits of the present invention without having to upgrade major components of the network system.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A method for providing a secure network path between network nodes, the method comprising:
   providing a home agent module on a network device on a foreign network side of an external firewall and providing a foreign agent module within a network zone created by the external firewall and an internal firewall, the home agent module and the foreign agent module creating a mobile IP proxy;
   establishing a secure data tunnel between the home agent module and the foreign agent module of the mobile IP (MIP) proxy;
   receiving a first registration request from a mobile node, said registration request including a permanent network address for the mobile node;
   sending a second registration request to a home agent specifying the permanent network address and a proxy care-of address;
   creating a network data tunnel between the mobile node and the mobile IP proxy;
   creating a first security association between the mobile node and a VPN gateway using the permanent network address for the mobile node;
   creating a second security association between the home agent and the VPN gateway;
   utilizing, by the home agent, a mobile IP proxy IP address as the care-of address for the VPN gateway;
   processing, by the mobile IP proxy, network data received from the mobile node as a surrogate home agent;
   receiving by the home agent a packet of data from a corresponding node;
   routing the packet of data to the mobile IP proxy;
   processing, by the mobile IP proxy, the packet of data received from the home agent as a surrogate mobile node, the processing including routing the packet of data by the mobile IP proxy to the VPN gateway;
   encapsulating the packet of data in a security layer by the VPN gateway;
   receiving the encapsulated data by the mobile IP proxy from the VPN gateway; and
   routing the encapsulated data from the mobile IP proxy to the mobile node.

2. The method of claim 1, further comprising sending a home agent reply code received from the home agent to the mobile node.

3. The method of claim 1, wherein processing network data received from the home agent includes sending the network data to a Virtual Private Network (VPN) gateway for encapsulating in a security layer.

4. The method of claim 3, wherein encapsulating in a security layer comprises encapsulating in an IP Security (IPSec) layer and using the permanent network address for the mobile node as a source or destination address.

5. The method of claim 3, further comprising:
   receiving network data destined for the mobile node from the VPN gateway; and
   sending the network data to the mobile node.

6. The method of claim 1, wherein the security association is an IPSec security association.

7. The method of claim 1, and further comprising:
   receiving a registration request from a MIP proxy specifying a permanent network address associated with a mobile node and a care-of address associated with the MIP proxy;
   establishing a security association between the home agent and a VPN gateway; and
   establishing a binding specifying the care-of address associated with the MIP proxy as a care-of address for the VPN gateway.

8. The method of claim 7, wherein the security association is an IPSec security association.

9. The method of claim 7, further comprising tunneling the data in a mobile IP layer.

10. A tangible computer-readable medium encoded with a computer program including instructions to cause one or more processors to perform a method for providing a secure network path between nodes in a network, the method comprising:
    providing a home agent module on a network device on a foreign network side of an external firewall and providing a foreign agent module within a network zone created by the external firewall and an internal firewall, the home agent module and the foreign agent module creating a mobile IP proxy;
    establishing a secure data tunnel between the home agent module and the foreign agent module of the mobile IP proxy;
    receiving a first registration request from a mobile node, said registration request including a permanent network address for the mobile node;
    sending a second registration request to a home agent specifying the permanent network address and a proxy care-of address;
    creating a network data tunnel between a mobile node and the mobile IP proxy;

creating a first security association between the mobile node and a VPN gateway using the permanent network address associated for the mobile node;

creating a second security association between the home agent and the VPN gateway;

utilizing by the home agent a mobile IP proxy IP address as the care-of address for the VPN gateway;

processing, by the mobile IP proxy, network data received from the mobile node as a surrogate home agent;

receiving by the home agent a packet of data from a corresponding node;

routing the packet of data to the MIP proxy;

processing, by the mobile IP proxy, packet of data received from the home agent as a surrogate mobile node, the processing including routing the packet of data by the mobile IP proxy to the VPN gateway;

encapsulating the packet of data in a security layer by the VPN gateway;

receiving the encapsulated data by the MIP proxy from the VPN gateway; and routing the encapsulated data from the MIP proxy to the mobile node.

11. The tangible computer-readable medium of claim 10, further comprising sending a home agent reply code received from the home agent to the mobile node.

12. The tangible computer-readable medium of claim 10, wherein processing network data received from the home agent includes sending the network data to a Virtual Private Network (VPN) gateway for encapsulating in a security layer.

13. The tangible computer-readable medium of claim 12, wherein encapsulating in a security layer comprises encapsulating in an IP Security (IPSec) layer and using the permanent network address for the mobile node as a source or destination address.

14. The tangible computer-readable medium of claim 12, further comprising:

receiving network data destined for the mobile node from the VPN gateway; and sending the network data to the mobile node.

15. The tangible computer-readable medium of claim 10, wherein the security association is an IPSec security association.

16. The tangible computer-readable medium of claim 10, wherein the method further comprises:

receiving a registration request from a MIP proxy specifying a permanent network address associated with the mobile node and a care-of address associated with the MIP proxy;

establishing a security association between the home agent and a VPN gateway; and establishing a binding specifying the care-of address associated with the MIP proxy as a care-of address for the VPN gateway.

17. The tangible computer-readable medium of claim 16, wherein the security association is an IPSec security association.

18. The tangible computer-readable medium of claim 16, further comprising tunneling the data in a mobile IP layer.

\* \* \* \* \*

UNITED STATES PATENT AND TRADEMARK OFFICE
CERTIFICATE OF CORRECTION

| | | |
|---|---|---|
| PATENT NO. | : 7,616,597 B2 | Page 1 of 1 |
| APPLICATION NO. | : 10/325657 | |
| DATED | : November 10, 2009 | |
| INVENTOR(S) | : Changwen Liu et al. | |

It is certified that error appears in the above-identified patent and that said Letters Patent is hereby corrected as shown below:

In column 11, line 14, in Claim 10, after "proxy," insert -- the --.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,616,597 B2  Page 1 of 1
APPLICATION NO. : 10/325657
DATED : November 10, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1190 days.

Signed and Sealed this

Nineteenth Day of October, 2010

David J. Kappos
*Director of the United States Patent and Trademark Office*